United States Patent
Brady et al.

(10) Patent No.: US 6,891,862 B1
(45) Date of Patent: May 10, 2005

(54) MULTIPLEX HIERARCHY FOR HIGH CAPACITY TRANSPORT SYSTEMS

(75) Inventors: Jayne Brady, Belfast (IE); James Shields, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/497,107

(22) Filed: Feb. 3, 2000

(30) Foreign Application Priority Data

Apr. 26, 1999 (CA) .............................................. 2270019
Nov. 18, 1999 (CA) .............................................. 2289897

(51) Int. Cl.[7] .................................................. H04J 3/02
(52) U.S. Cl. ...................................... 370/539; 370/541
(58) Field of Search ................................ 370/498, 535, 370/537, 538, 539, 540, 542, 541, 545, 466, 513, 514, 506, 528, 380, 468, 474, 465

(56) References Cited

U.S. PATENT DOCUMENTS

| | | | | |
|---|---|---|---|---|
| 4,893,306 A | * | 1/1990 | Chao et al. ................... | 370/458 |
| 5,168,494 A | * | 12/1992 | Mueller ....................... | 370/535 |
| 5,210,745 A | * | 5/1993 | Guinand et al. ............. | 370/466 |
| 5,428,612 A | * | 6/1995 | Scheffel et al. .............. | 370/468 |
| 5,465,252 A | * | 11/1995 | Muller ......................... | 370/380 |
| 5,539,750 A | * | 7/1996 | Kivi-Mannila et al. ..... | 370/506 |
| 5,555,248 A | * | 9/1996 | Sugawara .................... | 714/704 |
| 5,579,310 A | * | 11/1996 | Heiles et al. ................. | 370/389 |
| 5,666,351 A | * | 9/1997 | Oksanen et al. ............. | 370/474 |
| 5,724,342 A | * | 3/1998 | Sihvola et al. ............... | 370/242 |
| 5,835,591 A | * | 11/1998 | Cochon et al. .............. | 380/212 |
| 6,011,802 A | * | 1/2000 | Norman ....................... | 370/466 |
| 6,385,213 B1 | * | 5/2002 | Nakamura et al. .......... | 370/513 |
| 6,487,223 B1 | * | 11/2002 | Tanonaka .................... | 370/539 |
| 6,603,776 B1 | * | 8/2003 | Fedders et al. .............. | 370/476 |

* cited by examiner

*Primary Examiner*—Ajit Patel
(74) *Attorney, Agent, or Firm*—Nortel Networks Limited

(57) ABSTRACT

The SONET/SDH multiplexing hierarchy is extended to very high rates by creating new virtual containers of a higher capacity, and their associate pointers. The multiplexing hierarchy nests the pointers into the payload, so that the number of pointers on the high capacity line is importantly reduced, as the high rate spans of the network do not see the STS-1/STM-1 pointer granularity. Fewer pointers result in reducing the current complexity of pointer processing. The complexity of the multiplexing hierarchy is also reduced by the use of larger containers. The hierarchy may be extended to higher rates, as needed, and may also be used for other technologies, besides SONET/SDH.

11 Claims, 11 Drawing Sheets

MULTIPLEX HIERARCHY FOR HIGH CAPACITY TRANSPORT SYSTEMS

BACKGROUND OF THE INVENTION

1. Field of the Invention

This invention is concerned with very high capacity transport systems, and in particular with a method of providing a multiplex hierarchy for very high capacity transport systems.

2. Background Art

The dominant signal format in the fiber optic networks follows the synchronous standard SONET in North America and SDH elsewhere. SONET/SDH enables multiplexing, adding/dropping, and general transportation of signals. SONET/SDH is a physical carrier technology, which can provide transport services for ATM, SMDS, frame relay, T1, E1, etc. As well, operation, administration, maintenance and provisioning (OAM&P) features of SONET/SDH provide the ability to reduce the amount of back-to-back multiplexing, and more importantly, network providers can reduce the operation cost of the network.

The SONET standard Bellcore GR-253-CORE and SDH standard ITU G.707 define the physical interface, optical line rates known as optical carrier signals, a frame format, and an OAM&P protocol. Opto/electrical conversion takes place at the periphery of the SONET/SDH network, where the optical signals are converted into a standard electrical format called the synchronous transport signal (STS) in SONET or synchronous transport module (STM) in SDH.

These standards define a basic rate, which is STS-1 for SONET and STM-1 for SDH. The rate of an STM-1 is three times higher than the rate of an STS-1. Lower and higher rate signals are defined from these basic rates. The lower rate signals are called VT (virtual tributaries) for SONET, and VC (virtual containers) for SDH. The higher rate signals are called STS-N and STM-N, respectively, where "N" takes in practice certain integer values. Examples of SONET STS-N signals are STS-3, STS-12, STS-48, STS-198, etc. Examples of STM-N signals are STM-3, STM-4, STM 64, etc.

Frame structures with a very flexible granularity may be obtained by multiplexing lower rates tributaries in an appropriately sized frame, in a hierarchy that allows correctly delivering the signal to its owner. A tributary may have a phase offset with respect to the beginning of the frame, so that pointers are used to "point" to the first byte of information. The complexity of the frame hierarchical structure increases with the bit-rate, so that assembly and disassembly, as well as processing of the associated pointer information became more complicated. These operations must be performed separately for each signal, which means a large silicon area required with the inherent disadvantages.

For instance, in the case of a STM-1 frame with 64 VC-12 signals, each of the transmitting and receiving nodes must be equipped with common equipment that demultiplexes/multiplexes the VC's and processes the pointers, as well as with 64 independent channels, one for each VC. Each channel needs buffers, means for interpreting the pointers for aligning the incoming tributaries, means for generating the new pointers for the outgoing signals, etc. For same VC-12 granularity, the number of channels for a STM-64 increases to 64×64=4086.

U.S. Pat. No. 5,666,351 (Oksanen et al.) issued on Sep. 9, 1997 and assigned to Nokia Telecommunications Oy discloses a method for assembling and disassembling SDH frame structures with less hardware. At least two signals at the same hierarchy level are processed simultaneously, resulting in a time-division architecture. While the required silicon area is reduced with this architecture, the complexity of pointer processing is not. Also, this patent is not concerned with reducing the bandwidth occupied by the pointers during the transport of hierarchically multiplexed signals.

There remains a need for an efficient multiplexing hierarchy for high capacity transport networks, with a reduced pointer density, for simplifying the operations necessary for pointer processing, and for reducing the bandwidth of the high speed signal.

SUMMARY OF THE INVENTION

It is an object of the present invention to provide an efficient multiplexing hierarchy for high capacity synchronous transport networks, that alleviates totally or in part the drawbacks of the existing multiplexing hierarchies.

Another object of the invention is to provide a novel multiplexing hierarchy that uses nested pointers, whereby the high rate spans of a transport network do not see the STS-1/STM-1 pointer granularity.

Still another object of the present invention is to extend the SONET/SDH multiplexing hierarchy to higher rates by creating a new virtual container of a higher capacity, and its associate pointer.

According to one aspect of the invention, there is provided a method of assembly a frame structure of a SDH signal at a hierarchy level N, comprising, receiving a hierarchically multiplexed administrative unit AU-n comprising a payload and an AU-n pointer, converting said AU-n to a tributary unit TU-n, and hierarchically multiplexing said TU-n into said frame structure, where $n \geq 3$, and gives the granularity of said SDH signal, and said AU-n pointer provides the beginning of said payload with respect to said frame.

According to a further aspect of the invention, there is provided a method of assembling a frame structure of a SDH signal comprising, receiving a hierarchically multiplexed administrative unit AU-n-mc comprising a concatenated payload and an AU-n-mc pointer, converting said AU-n-mc to a tributary unit TU-n-mc, and hierarchically multiplexing said TU-n-mc into said frame structure, where $n \geq 3$, and gives the granularity of said payload, m is he level of concatenation and said AU-n pointer provides the beginning of said payload with respect to said frame.

According to yet a further aspect of the invention, there is further provided a method of reducing the number of AU pointers of a very high speed synchronous transport signal STM-N with AU-n granularity, an AU-n unit having an AU pointer and an AU payload, the method comprising, for each AU-n unit, hiding said AU-n pointer into said AU payload, translating said AU-n payload to a TU-n payload, and hierarchically multiplexing said TU-n into said frame structure.

The invention is further directed to a hierarchically multiplexed signal for transport over a multiplex section of a synchronous network, comprising-a payload field with a coarse AU granularity corresponding to the granularity of a higher order tributary, said payload field carrying a plurality of fine granularity AU pointers hidden in a TU pointer area, and-a section overhead field including a coarse granularity AU pointer.

The novel hierarchy uses preferably a single pointer at the STM-4/STS-12 level and a path overhead with a minimum granularity of an STS-12/STM-4 SPE. Of course, higher minimum granularities for the pointers and the POH can also be selected for even faster rates.

The tributary interfaces described are SDH/SONET in nature. Nonetheless, the novel multiplexing hierarchy may support other interfaces, such as 1G Ethernet.

An advantage of the multiplexing hierarchy according to the invention is a reduced number of pointers on the high capacity line. Fewer pointers results in reducing the current complexity of pointer processing.

Another advantage of the multiplex hierarchy according to the invention is scalability, i.e. the hierarchy may be extended to higher rates, as needed.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

The multiplex hierarchy is described in connection with the SDH standard, but it is to be understood that the invention is equally applicable to SONET signals or to non-SONET/SDH signals. The conventions and terminology used in this document are in line with G.707.

Figure 1:
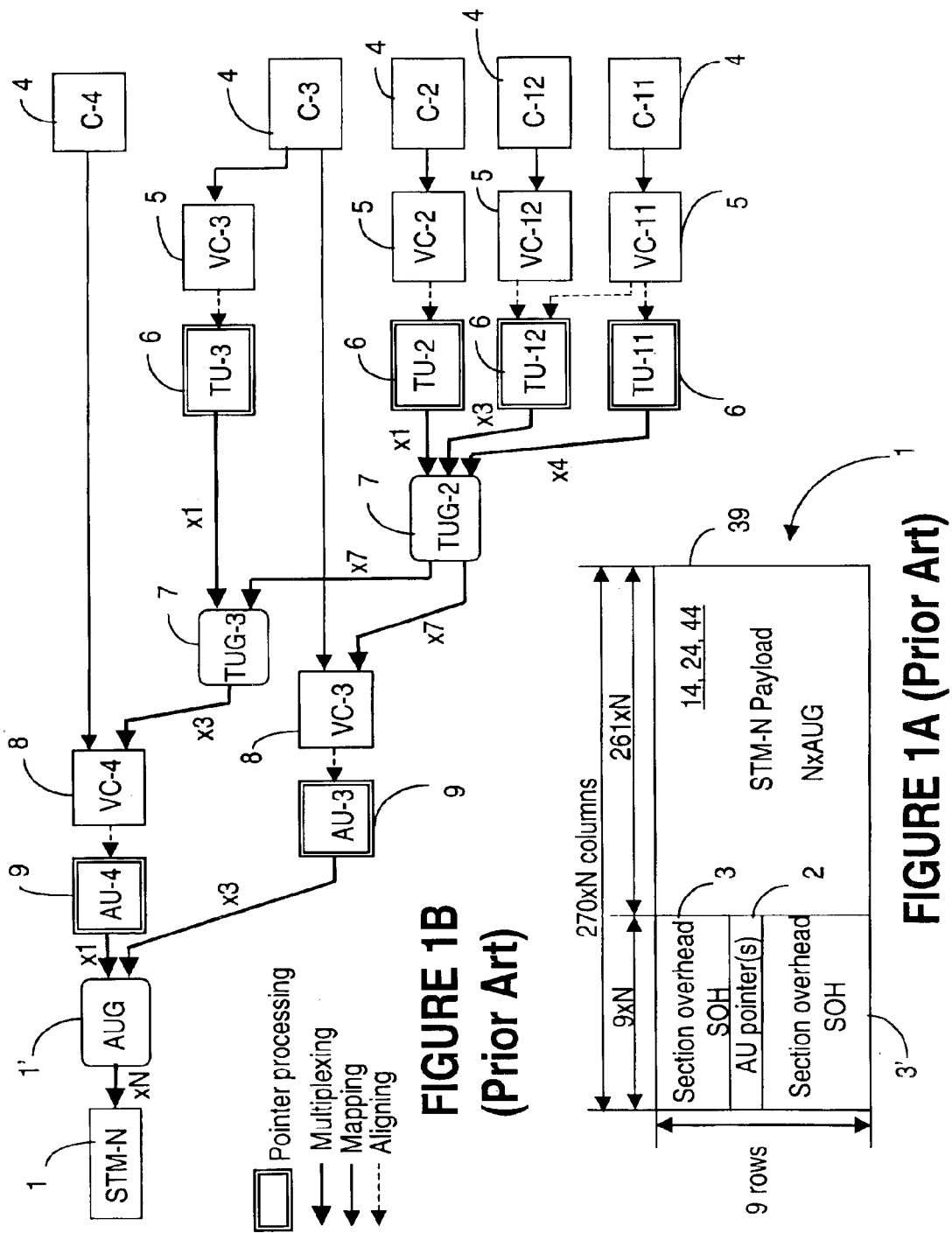
FIG. 1A shows an STM-N frame.
FIG. 1B shows the current multiplexing hierarchy as detailed in G.707.

Some of the terms used in this specification are defined next in connection with FIGS. 1A and 1B. FIG. 1A shows an STM-N frame 1 and FIG. 1B shows the current multiplexing hierarchy as detailed in G.707, for generating frame 1 with containers of various sizes. The double-line boxes on FIG. 1B indicate a pointer processing operation, and a course dotted line coming into such boxes indicates an aligning operation. The pointer processing and the corresponding alignment of the payload are performed at the TU-n and AU-n level. The thicker solid lines indicate a multiplexing operation, and the thinner solid lines indicate a mapping operation. Same representations are maintained throughout the drawings.

Synchronous Transport Module (STM)

A STM is the information structure used to support section layer connections in an SDH network. The information is organized in a block frame structure which repeats every 125 microseconds. The information is suitably conditioned for serial transmission on the selected media at a rate, which is synchronized to the network. A basic STM is defined at 155,520 Kbit/s. This is termed STM-1 and is analogous to the GR.253 SONET STS-3.

FIG. 1A illustrates an STM-N frame 1 organized in 9 rows and 270×N columns, where N gives the rate of the respective STM-N. Frame 1 comprises an information payload field 39, which takes 261×N columns, and an overhead field 3, 3', which takes 9×N columns.

An overhead field is necessarily added in the STM frame for OAM&P purposes, such as fault and performance monitoring, start of frame, start of payload, etc. The overhead comprises OAM&P information field 3 for the regenerator section layer, and field 3' for multiplex section layer.

The regenerator section (section in SONET terminology) layer deals with the transport of multiplexed signals across a physical medium. A regenerator section is a portion of the transmission facility between two regenerators, add-drop multiplexers (ADM) or terminals. Functions include framing, scrambling, section error monitoring and an embedded communication channel.

The multiplex section (line in SONET terminology) layer provides synchronization and multiplexing for the path layer. A multiplex section is a portion of the transmission facility between two consecutive add-drop multiplexers or terminals (TM).

The path layer deals with the transport of services, such as CEPT-1, between ADMs, terminals serving routers, bridges, PBXs or switches. A path overhead (POH) is necessarily added for monitoring the tributaries. The main function of the path layer is to map the services and POH into STM-1s. The higher multiplexing level for POH is currently at the STM-1 level, and the lower multiplexing level is at the VC-11 level.

STM-N information payload field 39 comprises path overhead information for each tributary carried in the field 39, an effective payload field 44, and columns with fixed stuff necessary for maintaining the synchronous rate at the respective hierarchical level. This field may have various granularities, allowing a large degree of flexibility for the rates of the tributaries that form the high rate signal. The current and new multiplexing hierarchies are described next for various granularities of the payload field 39.

Throughout the specification, the information payload field (or the payload) is referred to with reference numeral 39, the effective information with 44, the stuff bytes with 24, and the POH bytes with 14.

Container-n (C-n):

A container is the information structure which forms the synchronous information payload.

Adaptation functions have been defined for many common network rates into a limited number of standard containers, namely Container-1 (C-11, C-12), Container-2 (C-2), Container-3 (C-3) and Container-4 (C-4). These containers are defined in G.707, and are used currently in the synchronous networks as the basic information unit to be multiplexed into an STM frame. These G.707 containers are denoted with 4 throughout the specification, irrespective of their size, for simplification.

Some services that operate at a higher rate may be transmitted in a concatenated signal. Concatenation is a procedure by which tributaries having same source and destination are adapted into larger container sizes as a multiple integer of one of the above containers with a single POH, and travel together along the same path. For example, services that may fit into sixteen C-4 containers may be mapped into a C-4-16c container, which is 16 times larger than a C-4, G.707 defines concatenations of C-4.

Figure 2:
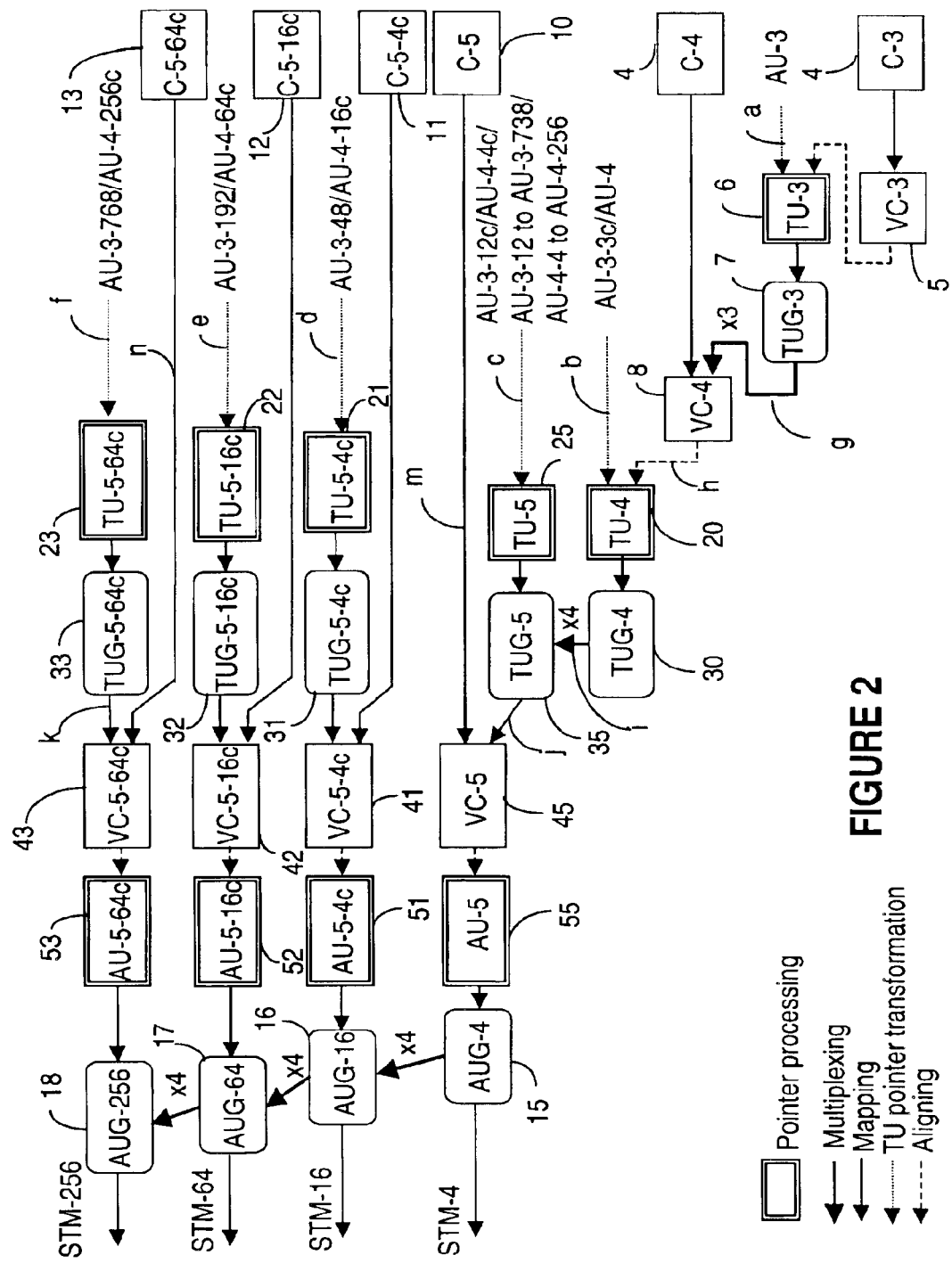
FIG. 2 shows a block diagram of the multiplexing hierarchy according to an embodiment of the invention, for a VC-5 granularity.

This specification defines, in addition to the G.707 containers, higher order containers C-n, where n≧5. C-5 is selected of a size corresponding to an STM-4 or a SONET STS-12, and is shown in FIG. 2 at 10. Concatenations of C-5 at the 4, 16 and 64 level are also defined herein, shown in FIG. 2 at 11, 12 and respectively 13.

The capacity of the containers currently in use and of the containers newly defined in this specification is detailed in Table 1. The new containers and their sizes are indicated in bold. Larger containers such as C-6, C-7, C-8, etc., not shown in Table 1, are also the object of this invention, the respective rates being determined by extrapolation.

TABLE 1

Payloads for higher order containers.

| New containers | | G.707 Container-n | |
|---|---|---|---|
| Container-n (C-n) | Payload (MBps) | (C-n) | Payload (MBps) |
| C-3 | 48.384 | C-3 | 48.384 |
| C-4 | 149.760 | C-4 | 149.760 |
| C-5 | 603.648 | C-4-4c (4 × C-4) | 599.040 |
| C-5-4c (4 × C-5) | 2,414.592 | C-4-16c (16 × C-4) | 2,396.160 |
| C-5-16c (16 × C-5) | 9,658.368 | C-4-64c (64 × C-4) | 9,584.640 |
| C-5-64c (64 × C-5) | 38,633.472 | C-4-256c (256 × C-5) | 38,338.560 |

It is to be noted that the payload for the newly defined containers is slightly larger than that of the corresponding G.707 container. This is due to the extra columns allocated for nesting pointers in an AU-n to TU-n translation, as it will be described later.

Virtual Container-n (VC-n):

For each of the defined containers, there is a corresponding virtual container (VC). A virtual container is the information structure used to support path layer connections in the SDH. It comprises the effective information payload 44 in a respective container and the POH information pertinent to the path between the end users of the respective payload information. Alignment information to identify the VC-n frame start is provided by the server network layer.

G.707 describes virtual containers up to a VC-4, as shown in FIG. 1B. Existing VC's are classified into lower order virtual containers VC-11, VC-12, VC-2 and VC-3, denoted herein with 5, and higher order virtual containers VC-3 and VC-4, denoted herein with 8. A higher order VC can carry payloads of lower order VC's multiplexed together, each having its own POH. For example a VC-3 could be made of 28×VC-11, 21×VC-12, 14×VC-1, 7×VC-2 or 1×VC-3. A VC-4 could be made of 3×VC-3, or a VC-4, etc.

This specification defines in addition to the virtual containers 5 and 8, higher order VC-n's, where n≧5, corresponding to new containers C-n. The new VC-5 has a payload equivalent to an STM-4/STS-12 SPE. Thus, a VC-5 comprises the information in a C-5 and the POH corresponding to that level.

Concatenations of VC-5 at the 4, 16 and 64 level are also defined herein.

Tributary Unit-n (TU-n):

A tributary unit TU is an information structure which provides adaptation between the lower and higher order paths. It comprises an information payload of a correspondingly sized order virtual container, and a tributary unit pointer (TU pointer), for VC-n alignment. VC-n alignment is a procedure by which the VC offset information is incorporated into a TU frame, to adapt the payload frame start relative to the higher order virtual container frame start. The pointers are located in the first column(s) of the TU.

As shown in FIG. 1B by reference numeral 6, G.707 describes tributary units up to TU-3. The lower visible TU pointer granularity in the current synchronous networks is at the TU-11 level.

The present invention extends the concept of the tributary units TU-n for n=4, namely TU-4 shown in FIG. 2 at 20 and for n=5, namely TU-5 25. Also, concatenations at the TU-4 level are provided for, such as units shown at 21, 22 and 23 on FIG. 2. Of course, the invention is applicable also to higher values for n (i.e. to higher rates).

Tributary Unit Groups-n (TUG-n)

One or more tributary units 6, can be multiplexed and mapped into fixed, defined positions in a higher order VC-n payload, forming a tributary unit group (TUG) 7. TU multiplexing is a procedure by which multiple lower order path signals are adapted into a higher order path. The multiplexing operation is shown in the drawings in thick solid lines, with a nearby multiplexing factor.

TUG's are defined in such a way that mixed capacity payloads made up of different size tributary units can be constructed to increase flexibility of the transport network.

For example, FIG. 1B shows that a TUG-2 may comprise a homogeneous assembly of identical TU-1s (i.e. 4 TU-1's or 3 TU-12's), or a TU-2. A TUG-3 may comprise a homogeneous assembly of lower order TUG's (i.e. seven TUG-2's), or a TU-3.

A higher order virtual container (n=3, 4) shown by reference numeral 8 on FIG. 1B, may comprise either a single higher order container, or an assembly of tributary unit groups 7 (TUG-2's, TUG-3's), together with a POH appropriate to that level. For example, a VC-4 can carry a container C-4, or 3× TUG-3's multiplexed together, while a VC-3 can carry a C-3 or 7×TUG-2's. TUG's are defined in such a way that mixed capacity payloads made up of different size tributary units can be constructed to increase flexibility of the transport network.

The present invention defines new groups TUG-4 and TUG-5, denoted with 30 and respectively 35. A TUG-4 may comprise a homogeneous assembly of TUG-3s or a TU-4, and a TUG-5 may include a homogeneous assembly of TUG-4s or a TU-5. Concatenations at the TUG-4 level are also new, and they are shown at 31, 32 and 33 in FIG. 2. The invention is also applicable to higher order TUG's.

Administrative Unit-n (AU-n):

An administrative unit AU, shown at 9 in FIG. 1B, is the information structure which provides adaptation between the higher order path layer and the multiplex section layer. It is obtained by mapping a higher order virtual container into the payload 39, and adding an administrative unit pointer, shown at 2 in FIG. 1A. The AU pointer location is fixed with respect to the STM frame and is located in the regenerator section overhead field 3.

AU pointers indicate the offset of the payload frame start relative to the multiplex section frame start.

G.707 currently describes administrative units AU-4 and AU-3; an AU-n is equivalent to the SONET STS, an AU-3 is equivalent to a SONET STS-1, and an AU-4 is equivalent to an STS-3c.

An STM-N described in G.707 comprises N×3 AU-3's, or N×AU-4's.

A new administrative unit AU-5 is introduced for the new multiplexing hierarchy descried herein, as illustrated at 55 on FIG. 2. The AU-5 comprises a VC-5 and an administrative unit pointer, which indicates the phase alignment of the VC-5 with respect to the STM-N frame. As in the case of the current hierarchy, the AU-5 pointer location is fixed with respect to the STM-N frame. Larger AU-n's, such as concatenations of the AU-5's are also the object of the invention.

The STM-N described in this document may comprise N×3 AU-3's, N×AU-4's or N/4 AU-5s, which are byte interleaved together.

Administrative Unit Group (AUG)

AU multiplexing is a procedure by which multiple higher order path layer signals are adapted into a multiplex section. As for the TU multiplexing, this operation is shown in the drawings in thick solid lines, with a nearby multiplexing factor.

One or more administrative units occupying fixed, defined positions in an STM payload form an administrative unit group (AUG). An AUG 1' consists of a homogeneous assembly of AU-3's, or AU-4's.

With the current multiplexing hierarchy shown in FIG. 1B, if the tributaries are STM-1/STS-3's, a 40 GBps signal (an STM-256) needs 256 pointers (AU-4 pointers) on the multiplex section (line) for AU multiplexing. It is apparent that if the STM-256 is obtained by hierarchically multiplexing AU-3s, (analogous to the SONET STS-1 multiplex hierarchy) the number of AU-3 pointers on the multiplex line becomes 768, since the payload field comprises 786 AUG-3's. Clearly, a straightforward extrapolation of the existing multiplexing pattern will create increasingly higher STS pointer density as the rate of the network grows. It is also evident that for very high capacity transport systems, granularity of this order is not required and indeed adds significant complexity to any product.

With the newly introduced AU-5, an AUG-4 illustrated at 15 on FIG. 2, may be made of an AU-5. In addition, higher order AUG's, such as AUG-16, AUG-64 and AUG-256 are shown at 16, 17 and 18.

FIG. 2 shows the relationship between various multiplexing elements with the new containers and the novel multiplexing hierarchy, for obtaining an STM-256 (STS-786) with VC-5 granularity. The lines marked with letters on FIG. 2 show operations that are not provided for by G.707, and which are described in more details in FIGS. 4–17.

TU pointer transformation is a procedure introduced by this invention, whereby the AU pointer is adapted to become a TU pointer, i.e. the AU pointer is removed from the SOH and placed in the payload. Nesting of pointers according to the novel hierarchy implies, in the example of FIG. 2, translation of AU-3's and AU-4's into the new tributary units TU-4 and TU-5. It is however to be understood that the invention is applicable for other rates. AU-to-TU translation and TU pointer transformation according to the present invention are illustrated by the fined dotted lines denoted with a–f.

For lower order containers, the multiplexing hierarchy is similar to that shown in FIG. 1B. For example, a C-3 container 4 is mapped into a VC-3 container 5 in the known way. In addition to the G.707 hierarchy, the TU-3 unit 6 may be now obtained also from an AU-3, using TU pointer transformation illustrated by line a. Namely, the AU-3 pointers are extracted from the SOH field and mapped into the payload field, as it will be explained in more details in connection with FIG. 4.

A TU-3 unit 6 is mapped into a TUG-3 group 7. A higher order VC-4 container 8 is obtained either by multiplexing three TUG-3 groups 7, shown by line g and detailed in FIG. 10, or directly from a C-4 container 4. The resulting VC-4 container 8 is now being aligned into the new TU-4 unit 20, using a TU pointer, rather than being aligned into an AU-4 using an AU pointer, as in G.707. This is shown by dotted line h on FIG. 2, and illustrated in more detail in FIG. 11.

Figure 5:
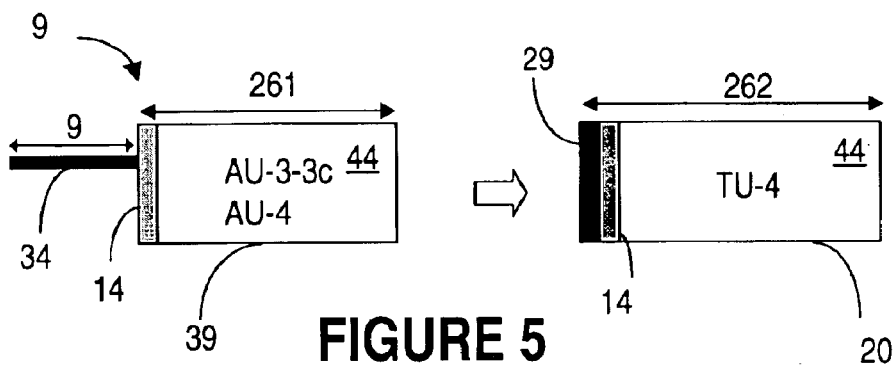
FIG. 5 shows the translation of an AU-3-3c or an AU-4 to a TU-4.

The new TU-4 unit 20 may also be comprised of an AU-3-3c or an AU-4, as shown by dotted line b. In this case, the AU pointers in the AU's are transformed into TU pointers, as illustrated in FIG. 5.

TU pointer transformation is also necessary for generating the new TU-5 unit 25, if formed with administrative units. A TU-5 may comprise an AU-2-12c, an AU-4-4c, an AU-3-12 to AU-3-738 or an AU-4-4 to AU-4-256, as shown by line c and illustrated in detail on FIG. 6.

FIG. 2 also shows TU pointer transformation for generating the new concatenated tributary units, such as TU-54c unit 21, TU-5-16c unit 22 and TU-5-64c unit 23. A TU-54c unit 21 may be formed from an AU-3-48 or an AU-4-16c, using TU pointer transformation shown by line d, and illustrated in more details in FIG. 7. A TU-5-16c unit 22 may be formed from an AU-3-192 or an AU-4-64c, using TU pointer transformation shown by line e, and further shown in more details in FIG. 8. Finally, a TU-5-16c unit 23 may be formed from an AU-3-786 or an AU-4-256c, using TU pointer transformation shown by line f, and further shown in more details on FIG. 9.

The translation from AU-n to their corresponding TU-n is shown in Table 2, which complements FIG. 2. The information content and pointers of both structures are identical, it is only the position of pointers with respect to the payload that changes during translation. Table 2 also shows how the very high rate network transports synchronous traffic created using byte interleaved AU-3s and AU-4s, by hiding the pointers from the line through nesting pointers. The last column indicates where a translation operation takes place in FIG. 2, and indicates the Figures where the respective operation is illustrated in more details.

TABLE 2

Relationship between Synchronous Module, AU-n and TU-n

| Tributary Interface | | Section OH Termination of tributaries | Au-TU Pointer Translation | Shown on |
|---|---|---|---|---|
| SDH | SONET | AU-n | TU-n | FIG. 2 |
| STM-0 | STS-1 | AU-3 | TU-3 | a (FIG. 4) |
| | STS-3c | AU-3-3c | TU-4 | b (FIG. 5) |
| | STS-12c | AU-3-12c | TU-5 | c (FIG. 6) |
| | STS-48c | AU-3-48c | TU-5-4c | d (FIG. 7) |
| | STS-192c | AU-3-192c | TU-5-16c | e (FIG. 8) |
| | STS-768c | AU-3-768c | TU-5-64c | f (FIG. 9) |
| STM-1 | | AU-4 | TU-4 | b |
| STM-4-4c | | AU-4-4c | TU-5 | c |
| STM16-16c | | AU-4-16c | TU-5-4c | d |

TABLE 2-continued

Relationship between Synchronous Module, AU-n and TU-n

| Tributary Interface | | Section OH Termination of tributaries | Au-TU Pointer Translation | Shown on |
|---|---|---|---|---|
| SDH | SONET | AU-n | TU-n | FIG. 2 |
| STM-64-64c | | AU-4-64c | TU-5-16c | e |
| STM-256-256c | | AU-4-256c | TU-5-64c | f |
| | STS-3 | AU-3-3 | TU-4 | b |
| | STS-12 | AU-3-12 | TU-5 | c |
| | STS-48 | AU-3-48 | TU-5-4 | c |
| | STS-192 | AU-3-192 | TU-5-16 | c |
| | STS-768 | AU-3-768 | TU-5-64 | c |
| STM-4 | | AU-4-4 | TU-5 | c |
| STM-16 | | AU-4-16 | TU-5-4 | c |
| STM-64 | | AU-4-64 | TU-5-16 | c |
| STM-256 | | AU-4-256 | TU-5-64 | c |

All the tributary interfaces in the table are actual SDH/SONET and are therefore mapped into an AU-3-nc or AU-4-nc format. The new administrative group AU-5 is not shown in Table 2 since it is assigned only to VC-5s or TUG-5s. These clients will be mapped into TU-5-mc's which will in turn be mapped into VC-5s and an AU-5 pointer will then be added.

The first row in Table 2 shows "hiding" of the tributary pointers necessary for translating AU-3's to TU-3's. All other tributary units listed in Table 2 refer to the new containers, i.e. TU-4 and TU-5.

The new tributary unit groups TUG-4 and TUG-5 denoted with 30 and 35 respectively, are obtained by mapping a respective tributary unit TU-4 and TU-5. A TUG-5 group 35 may alternatively be obtained by multiplexing four TUG-4's, as indicated by line i and detailed in FIG. 12.

Figure 16:
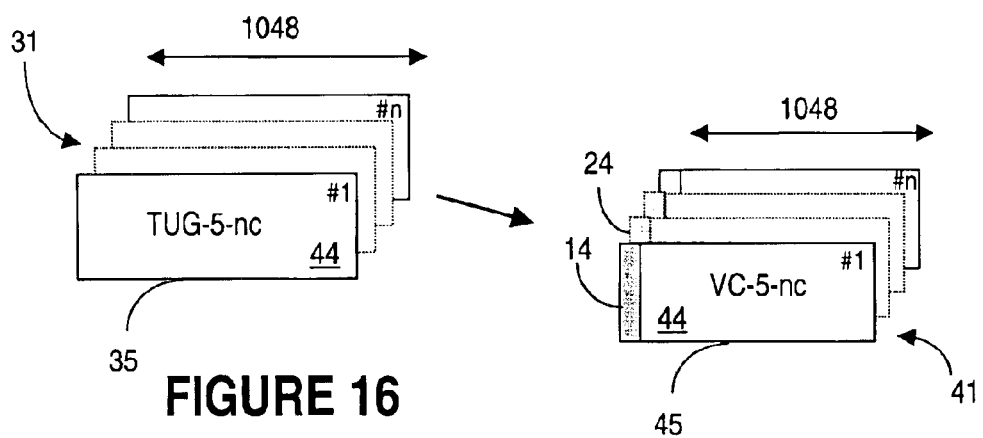
FIG. 16 illustrates mapping of a TUG-5-nc into a VC-5-nc.

A TUG-5-nc is mapped into an adequate VC-5-nc by adding the POH appropriate for that level, as shown by line k and detailed in FIG. 16. The VC-5-nc container is then aligned into the respective AU-5-nc unit, and a respective STM-N is generated as indicated above.

Figure 13:
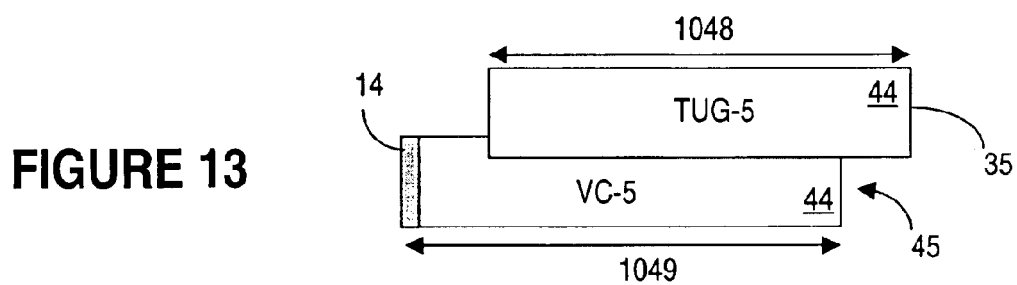
FIG. 13 shows mapping of a TUG-5 into a VC-5.
Figure 14:
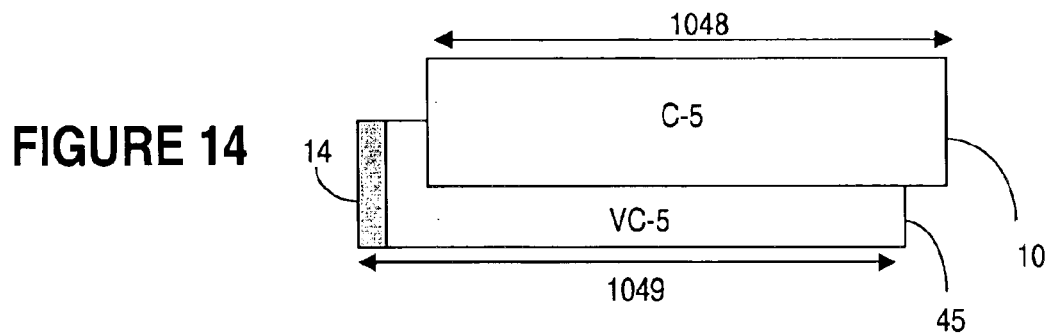
FIG. 14 illustrates mapping of a C-5 into a VC-5.

A TUG-5 or a C-5 may be mapped into the new VC-5container 45, as shown by the thin solid lines j and m, and detailed in FIGS. 13 and 14. Larger containers, such as C-6 (or C-5-4c), C-7 (or C-5-16c), and C-8 (or C-5-64c), map into a VC-5-nc, by adding the path overhead, as shown by example with line n and detailed in FIG. 15.

Figure 17:
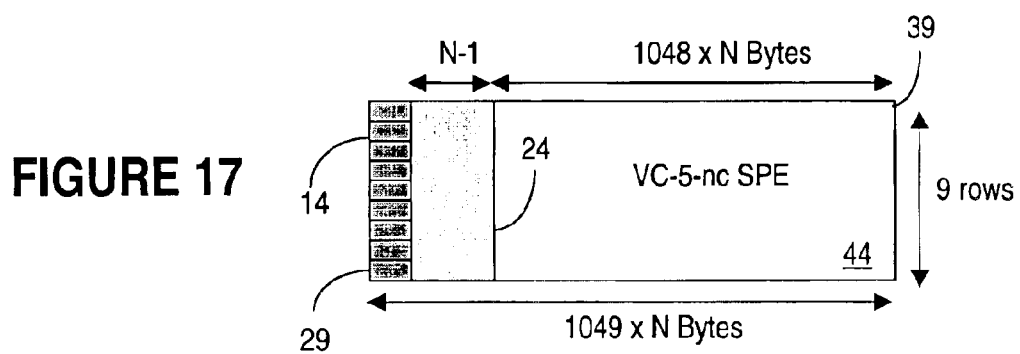
FIG. 17 shows concatenation of a VC-5-nc.

Due to concatenation, VC-5-nc's 41, 42, and 43 have (n-1) less columns than if they were generated from the corresponding lower order containers. To maintain the AU-5 frame size, N-1 columns of fixed stuff need to be added, as shown in FIG. 17. For example, for a C-5-4c there will be one column of path overhead and three, (n-1, where n=4), columns of fixed stuff mapped into a VC-54c. Although it may seem advantageous to remove these additional columns of fixed stuff for the C-54c mapping and assign them as payload, the fixed stuff columns are not removed in the interests of scalability. This is because as the hierarchy scales and a VC-6 and AU-6 are created, the TUG-6 (TUG-5-4c, in this hierarchy) will normally map into a VC-6 instead of a VC-54c. This TUG-6 to VC-6 mapping will add a column of path overhead, but no fixed stuff. If the C-5-4c container were increased to use the columns of fixed stuff for the AU-5 hierarchy, it would be too large to map into a VC-6 for an AU-6 hierarchy.

The AU-5 unit 55 comprises a VC-5 45 and the respective administrative unit pointer, which indicates the phase alignment of the VC-5 with respect to the STM-N frame. With the newly introduced AU-5 unit 55, an AUG-4 group 15, made currently of four AU-4's or twelve (4×3) AU-3's according to G.707, may also be made of an AU-5 unit 55, as shown in FIG. 2.

Figure 3:
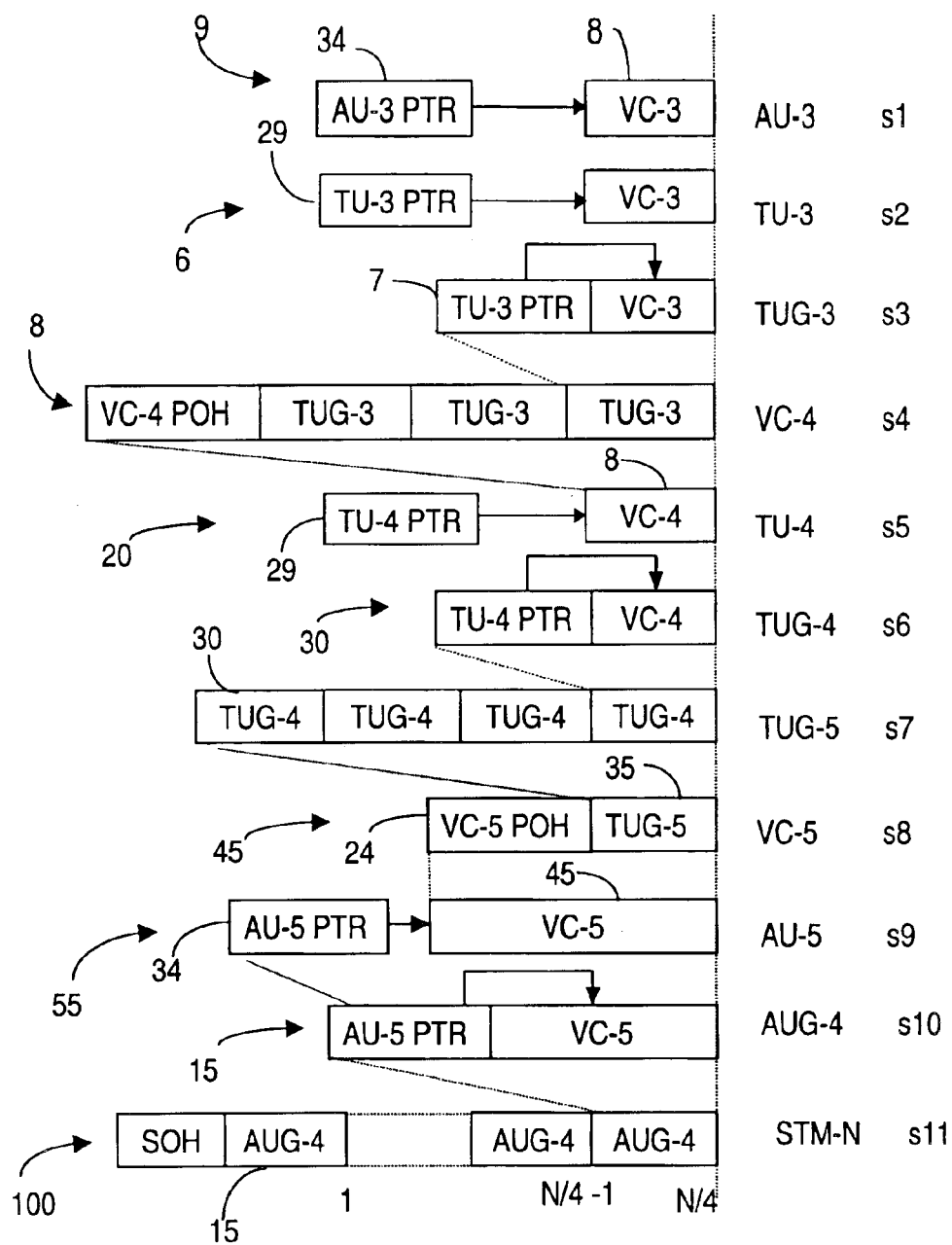
FIG. 3 illustrates creation of a STM frame directly from AU-3's using TU pointer transformation.

FIG. 3 shows an example of how an STM-N is made starting with AU-3 units 9 and using the new VC-5 container 45, as illustrated also by the hierarchy depicted along the path illustrated in FIG. 2, from fine dotted arrow a showing AU-3 translation, to AUG-4 group 15.

In the first step s1, the AU-3 unit 9 is shown as comprising a VC-3 and the respective AU-3 pointers 34. Next, in step s2 the AU-3 is translated into a TU-3 unit 6 by transforming the AU-pointers 34 into TU-3 pointers 29. The TU-3 unit 6 is mapped into a TUG-3 group 7 in step s3, and three TUG-3's are multiplexed into a VC-4 container 8, shown in step s4. At this point, the POH 14 is added at the VC-4 level. The VC-4 is aligned into the new TU-4 unit 20 using the respective TU-pointers 29, shown in step s5, and the TU-4 is mapped into a TUG-4 group 30, shown in step s6.

On the next multiplexing level, four TUG-4's are multiplexed into a TUG-5 group 35 in step s7, and a container VC-5 45 is formed by adding the POH for this level, step s8. The VC-5 is aligned into the new AU-5 unit 55, by generating the AU pointers, s9, and the AU-5 is mapped into an adequate sized administrative unit group AUG-4 group 15, as shown in step s10. Finally, the STM-N is generated by multiplexing N/4 AUG-4 groups 15, and adding the section overhead.

Translation of AU-n to TU-n

Figure 4:
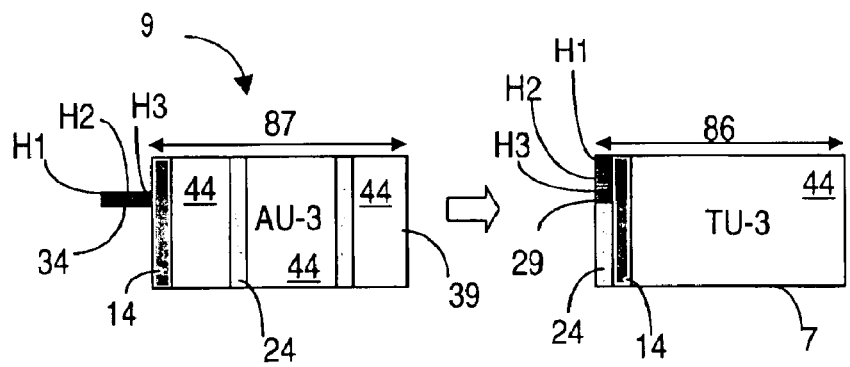
FIG. 4 shows how an AU-3 is translated to a TU-3.

FIG. 4 shows how an AU-3 (which has the rate of a SONET STS-1) is translated into a TU-3, (line a in FIG. 2). An AU-3 comprises an 87-columns by 9-rows field 39, and the AU pointer 34. The AU pointer includes bytes H1, H2 and H3 that give the beginning of field 39 into the frame. Field 39 includes the payload 44, a 9-byte POH 14, and fixed stuff columns 24.

A TU-3 consists of a 9 row by 86 columns field, including payload 44 (a VC-3), POH 14, and a TU-3 pointer 29. The TU-3 pointer, which includes bytes H1, H2, H3, gives the phase of the VC-3 within the TU-3. The TU pointer is located in the first column of the TU-3, the rest of the first column being allocated to fixed stuff 24.

The translation from AU-3 to TU-3 relies on removing the columns of fixed stuff 24 within the AU-3 payload, and mapping the AU pointers 34 into the first column of the TU-3.

FIG. 5 shows a translation from AU-4 or AU-3-3c to TU-4. Field 39 of AU-4 unit 9 includes 261 columns by 9 rows, with the 9-byte POH 14, which can carry a VC-4 or an STS-3c, and also comprises a 9-byte AU pointer field 34.

FIG. 5 also shows the size and structure of the new TU-4 unit 20. A TU-4 consists of 9 rows by 262 columns to carry a VC-4. The phase of the VC-4 with respect to the TU-4 is indicated by the TU-4 pointer 29 in the first column, comprising the three times bytes H1, H2 and H3. A TU-4 also has a 9-byte POH 14. The translation relies on allocating the first column of the TU-4 to the AU pointer 34, which becomes the TU pointer 29. As seen from Table 2, an AU-3-3 can also be translated to a TU-4 in a similar way.

Figure 6:
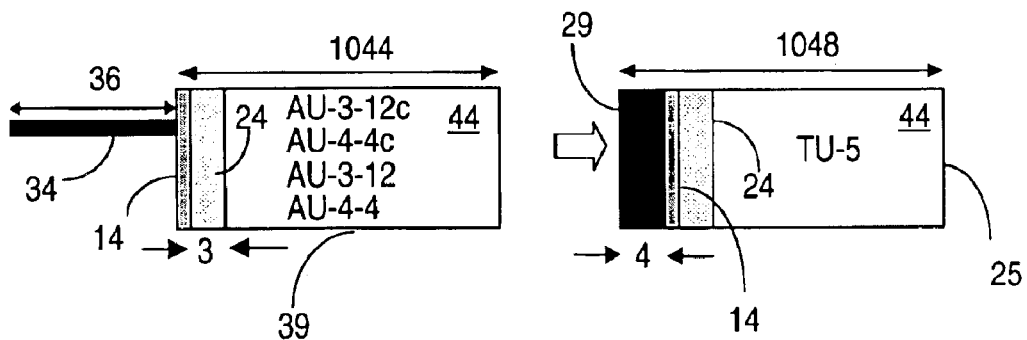
FIG. 6 illustrates the translation of an AU-3-12c, an AU-4-4c, an AU-3-12 or an AU-4-4 to a TU-5.

FIG. 6 shows a translation from an AU-3-12 (AU-3-12c) or an AU-4-4 (AU-4-4c) signal into a TU-5. G.707 requires that AU-3-12 (AU-3-12c) or AU-4-4 (AU-44c) be demultiplexed to the STM-1 level and byte interleaved as AU-4s. Using the multiplexing hierarchy according to the invention, it is now only necessary to demultiplex these signals to AU-5 granularity.

Field 39 of an AU-3-12 or an AU-4-4 comprises 1044 columns, with 3 columns of fixed stuff 24, a one-column POH 14 and the respective effective payload field 44. For the lowest granularity at this level, the AU pointers 36 occupy 36 (12×3) bytes. As such, a 4-column field is needed for accommodating the 36 bytes of the AU pointers 34 when the AU is translated into TU.

As such, the new TU-5 unit 25 has the first four columns (4×9=36 bytes) allocated to TU pointers 29. The TU-5 pointer has twelve H1, H2 and H3 bytes, which indicate the phase of the VC-5 with respect to the TU-5. The TU-5 unit 25 also comprises 1048 columns, for accommodating a VC-5, POH 14 and three columns of fixed stuff 24.

AU-3-n's and AU-4-n's with n>12 (n=48, 192, 256, 738, can be translated into TU-5's in a similar way.

Figure 7:
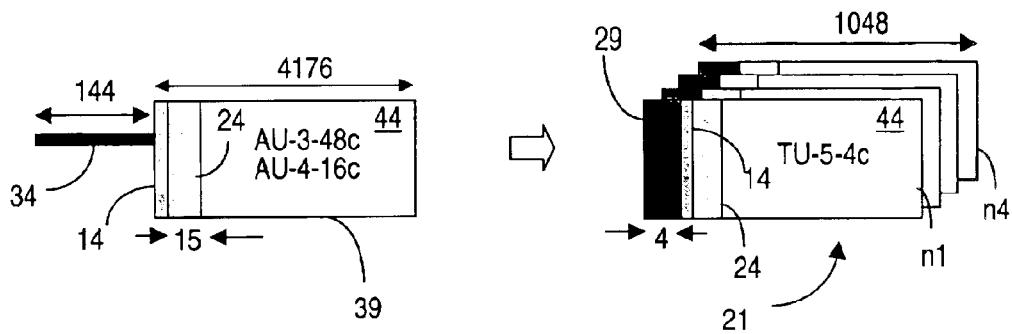
FIG. 7 shows the translation of an AU-348c or an AU-4-16c to a TU-5-4c.

FIG. 7 shows a translation from an AU-3-48c or an AU-4-16c signal into a TU-5-4c, line d in FIG. 2), with respective TU pointer transformation. Field 39 of an AU-3-48c has 4176 columns by 9 rows, with POH 14 and 15 columns of fixed stuff 24. The AU pointers 34 of the AU-3-48c occupy 144 bytes, which can be mapped to 16 columns (144:9=16). For transformation, the 16-column AU pointers are placed in the first four columns of each of the four TU-5's of the TU-5-4c, to give the phase of the VC-5-4c with respect to the TU-5. The POH 14 is placed in the $5^{th}$ column of the first TU-5.

Figure 8:
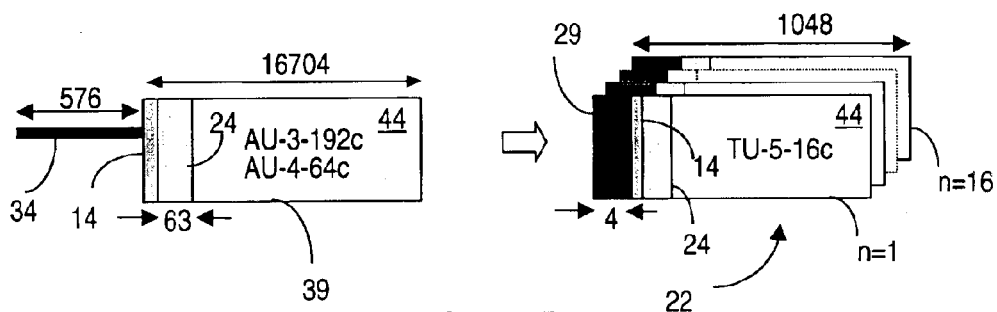
FIG. 8 illustrates the translation of an AU-3-192c or an AU-4-64c to an TU-5-16c.

FIG. 8 shows a translation from an AU-3-192c or an AU-4-64c signal into a TU-5-16c. Field 39 of this AU is 16704 columns by Crows (the size of 16 TU-5's), with a POH 14, 63 columns of fixed stuff 24 and a payload field 44. The size of the AU pointers 34 is 576, which requires 64 columns (576 bytes: 9 rows=64 columns=4×16). Similarly with the TU pointer transformation described in connection with FIG. 7, the first 4 columns of all 16 TU-5's are allocated to the TU pointers 29, and the single POH 14 is placed in the first TU-5 after the pointers 29. The phase of the VC-5-16c with respect to the TU-5-16c in indicated by the TU-5-16c pointer.

Figure 9:
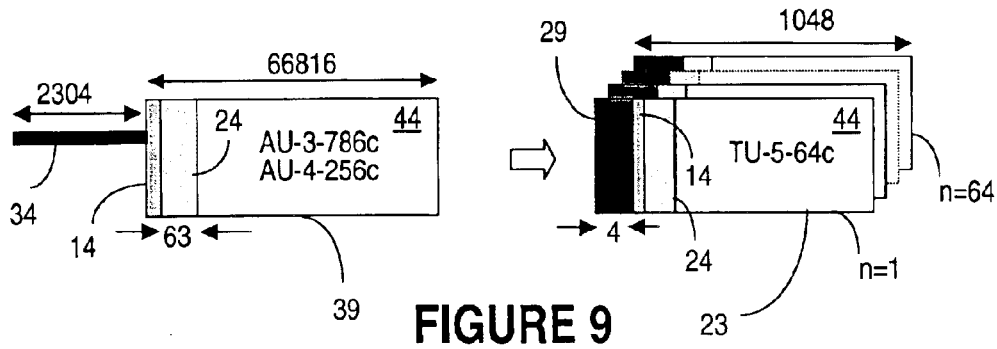
FIG. 9 shows the translation of an AU-3-768c or an AU-4-256c to a TU-5-64c.

FIG. 9 shows a translation from an AU-3-768c or an AU-4-256c signal into a TU-5-64c (line f in FIG. 2). Field 39 is 9 rows by 66816 columns (the size of 64 TU-5's), with POH 14 and 63 columns of fixed stuff 24. The size of the AU pointer 34 in this case is 2304, which requires 256 columns (2304 bytes: 9 rows=256=4×64 columns). The first four columns of the 9-row by 1048-column TU-5's are allocated to the TU-5 pointer 29, which now comprises the information in the AU pointer. The phase of the VC-5-64c with respect to the TU-5-64c in indicated by the TU-5-64c pointer.

New Mapping, Multiplexing and Aligning Operations

Figure 10:
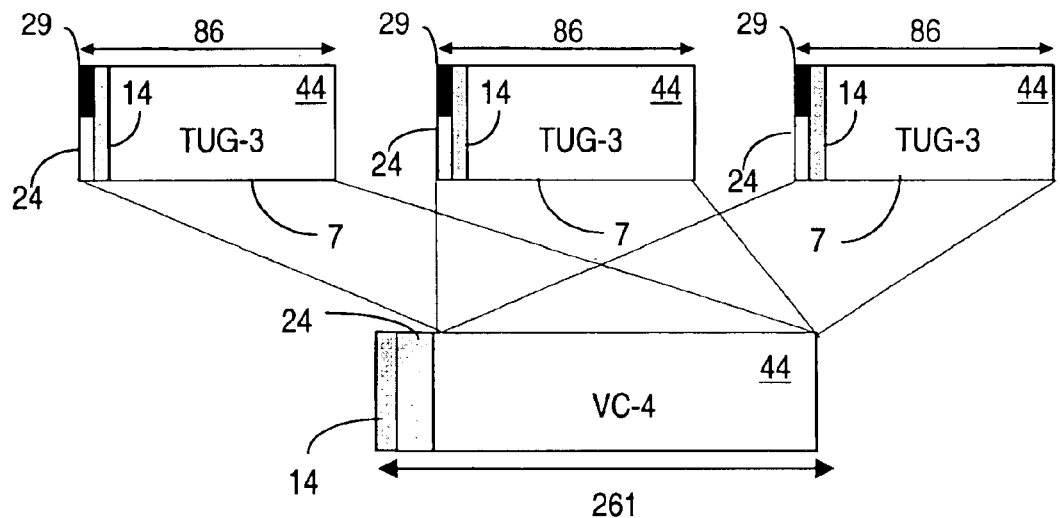
FIG. 10 shows mapping of a TUG-3 into a VC-4.

The arrangement of three TUG-3's multiplexed into a VC-4, line g in FIG. 2, is shown in FIG. 10. A TUG-3 group 7 is a 9-row by 86-column structure, with a TU pointer (H1, H2 and H3) in the first 3 rows of the first column, and a one-column POH 14. A VC-4 consists of one column 14 of VC-4 POH, two columns of fixed stuff 24 and a 258 column effective payload structure 44. The three TUG-3s are single byte interleaved into the 9-row by 258-column VCG-4 payload structure and have a fixed phase with respect to the VC-4. The TU pointers are "hidden" into payload field 44.

Figure 11:
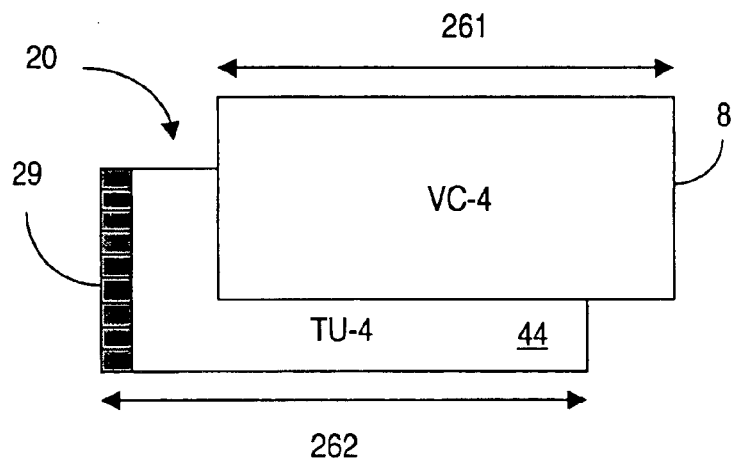
FIG. 11 shows aligning of a VC-4 into a TU-4.

The aligning of a VC-4 container 8 into a TU-4 unit 20 (line h on FIG. 2) is shown in FIG. 11. As indicated in connection with FIG. 5, a TU-4 consists of a VC-4 and a one-column TU-4 pointer 29, comprising three times bytes H1, H2 and H3. The phase of the VC-4 with respect to the TU-4 is indicated by the TU-4 pointer 29.

Figure 12:
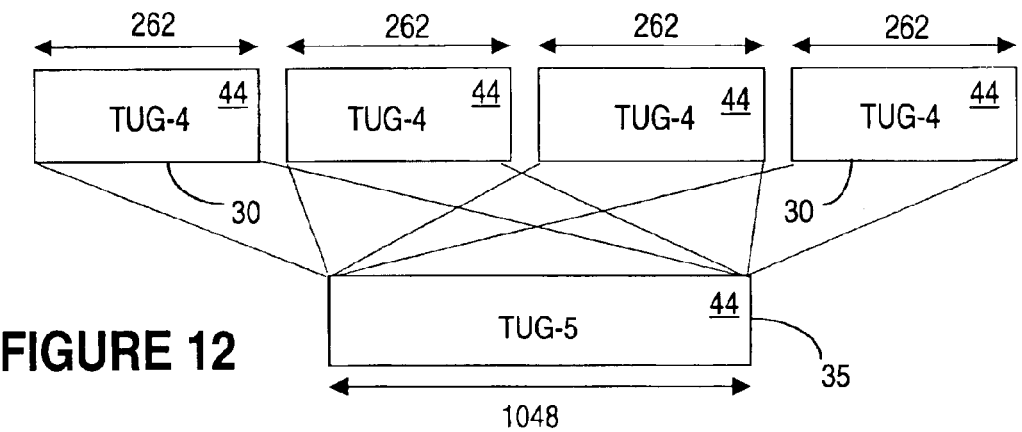
FIG. 12 shows multiplexing of TUG-4's into a TUG-5.

The preferred granularity for the novel multiplexing hierarchy is at VC-5 level. Therefore, the TUG-4 groups 30 are multiplexed into a TUG-5 group 35 as shown in FIG. 12 (line i on FIG. 2). A TUG-4 is a 9 rows by 262 columns structure, while a TUG-5 is a 9-row by 1048-column structure, so that four single byte interleaved TUG-4's form a TUG-5.

The mapping of a TUG-5 group 35 into a VC-5 container 45 is shown by line j on FIG. 2 and in more details in FIG. 13. FIG. 13 also shows the size and structure of the new VC-5 container 45. A VC-5 consists of one column of VC-5 POH 14 and a 1048 column payload structure, which is the size of TUG-5.

The mapping of a C-5 container 10 into a VC-5 container 45 is shown in FIG. 14. The C-5 is a 9-row by 1048-column structure. The VC-5 consists of one column 14 of VC-5 POH and a 1048 column payload structure 44.

Concatenation and Numbering Schemes

G.707 defines concatenated payloads at the VC-4 level. As a larger AU pointer and virtual container have been defined, it is now possible to perform concatenation at the VC-5 level.

Figure 15:
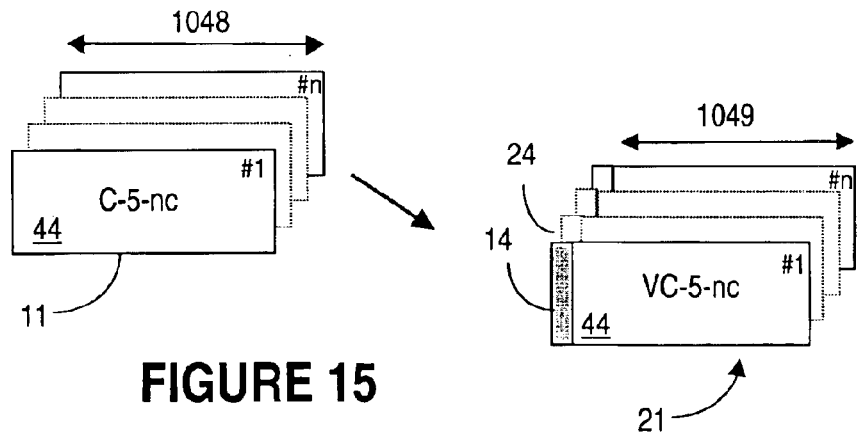
FIG. 15 illustrates the mapping of a C-5-nc into a VC-5-nc.

The mapping of a C-5-nc container 21, 22 or 23 into a VC-5-nc is shown by line n in FIG. 2 and is illustrated in more details in FIG. 15. The C-5-nc is a 9-row by 1048× n-column structure. The VC-5 consists of one column of VC-5 POH 14, n-1 columns of fixed stuff and a 1048×n column payload structure 44.

FIG. 16 shows the mapping from TUG-5-nc's into VC-nc's, where n defines the level of concatenation and can be for example 4, 16, 64, or higher. In this case, the first TUG-5 receives the POH 14 for the VC-5-nc, while the remaining (n-1) TUG-5's have a fixed stuff first column.

Concatenated tributary units are a new concept from G.707. FIG. 17 shows the frame size for a concatenated VC-5. To indicate the concatenated nature of the payload, a concatenation indicator 29 is assigned in the VC-5 path overhead 14. This is required to prevent misconnection of the concatenated VC-5 payload.

As shown in FIG. 1A, an STM-1 frame has 270 columns, the first nine containing the SOH and the remaining 261 columns containing the data payload. A numbering scheme is required to locate the TUG-n's within the very high speed network. G.707 defines a three-figure address (K, L, M) for the existing hierarchy. In the case of an AU-4 structured frame, K represents the TUG-3 number, L represents the TUG-2 number and M the TU-1 number. In the case of an AU-3 structured frame, only L and M are used.

This can logically be extended to include the new groups TUG-4 and TUG-5.

TABLE 3

TUG-n Numbering Scheme

| TUG-n | Address | Range of values |
|---|---|---|
| TUG-5 | I | 1,2,3,4 |
| TUG-4 | J | 1,2,3,4 |
| TUG-3 | K | 1,2,3 |

A numbering scheme is also required to locate the AU-5s within the network. G.707 defines a two figure address (A, B) where A represents the AU-3 number and B the AU-4 number. This can logically be extended to include the AU-5.

TABLE 4

AU-n Numbering Scheme

| AU-n | Address | Range of values |
|------|---------|-----------------|
| AU-5 | C | 1,2,3,4 |
| AU-4 | B | 1,2,3,4 |
| AU-3 | A | 1,2,3 |

Frame Structure of the STM-N

Figure 18:
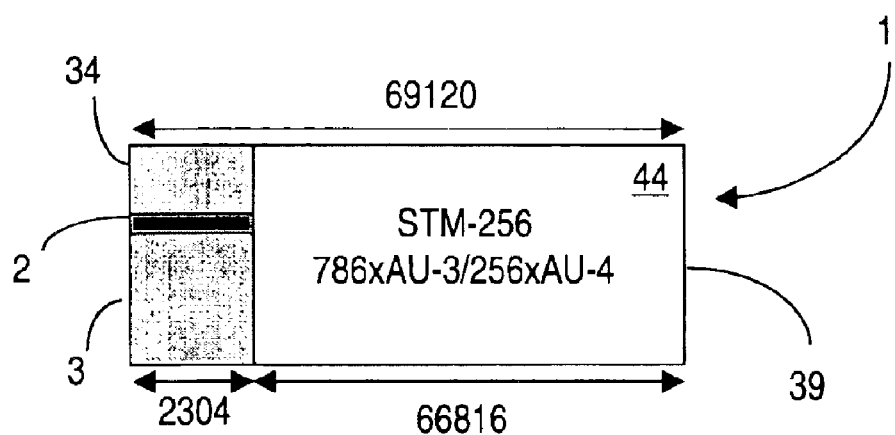
FIG. 18 illustrates the frame structure for byte interleaved at AU-3 or AU-4.

FIG. 18 shows an STM-256 1 with AU-3 granularity. The frame is 9 rows by 69120 columns (270×256), out of which 2304 columns (9×256) are used for the section overhead SOH, and 66816 for payload. Field 39 carries 786 AU-3's, it can also carry 256 AU-4's. It is apparent that the size of the AU pointers is 2304 bytes (256×9), shown by field 2 in FIG. 18.

Figure 19:
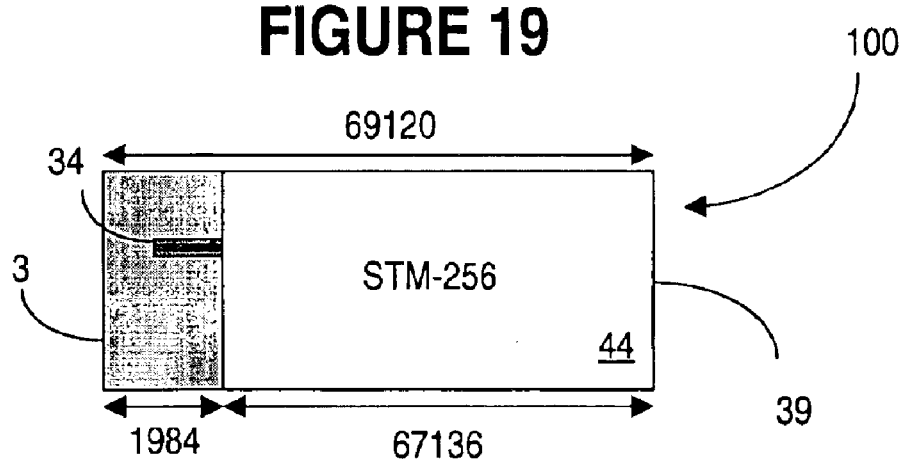
FIG. 19 illustrates the frame structure for the 40 GBps with higher order containers.

The STM-256/STS-768 frame structure 100 for the novel multiplexing hierarchy is shown FIG. 19, with a similar AU-3/AU-4 granularity. The payload field 39 has now 67136 columns, being 320 columns larger than that of frame 1. This is due to the bytes occupied by the nested pointers. As the payload is larger than for the current STM-N's, it is necessary to reduce the byte allocation for the SOH 3, 3' to maintain a line rate in even multiples of the existing SONET/SDH line rates.

As shown in FIG. 3, a STM-256 has now an AU-5 pointer that occupies a minimum of 64×3=1 92 bytes rather than 2304 bytes in frame 1 of FIG. 19.

This approach has assumed scaling the G.707 frame with 3 bytes assigned for each AU-5 pointer (1 byte for H1, H2 and H3).

The AU-5 pointer according to the novel multiplexing hierarchy may be optimized for system performance. Namely, while H1 and H2 may still be one-byte pointers, H3 may vary from one to twelve bytes allowing for a larger negative justification area.

There are a number of possible methods for constructing the frame for this novel multiplex hierarchy:

Maintain the line rate by keeping the frame size equivalent to a STM-256 frame consisting of AU-3s or AU-4s. This is achieved by reducing the number of columns for section and line overhead by 320. These reclaimed columns consisted of unused bytes.

Reduce the frame size to the minimum required to contain the pointers and the defined overhead bytes.

Embed the FEC and overhead within the frame.

Figure 20:
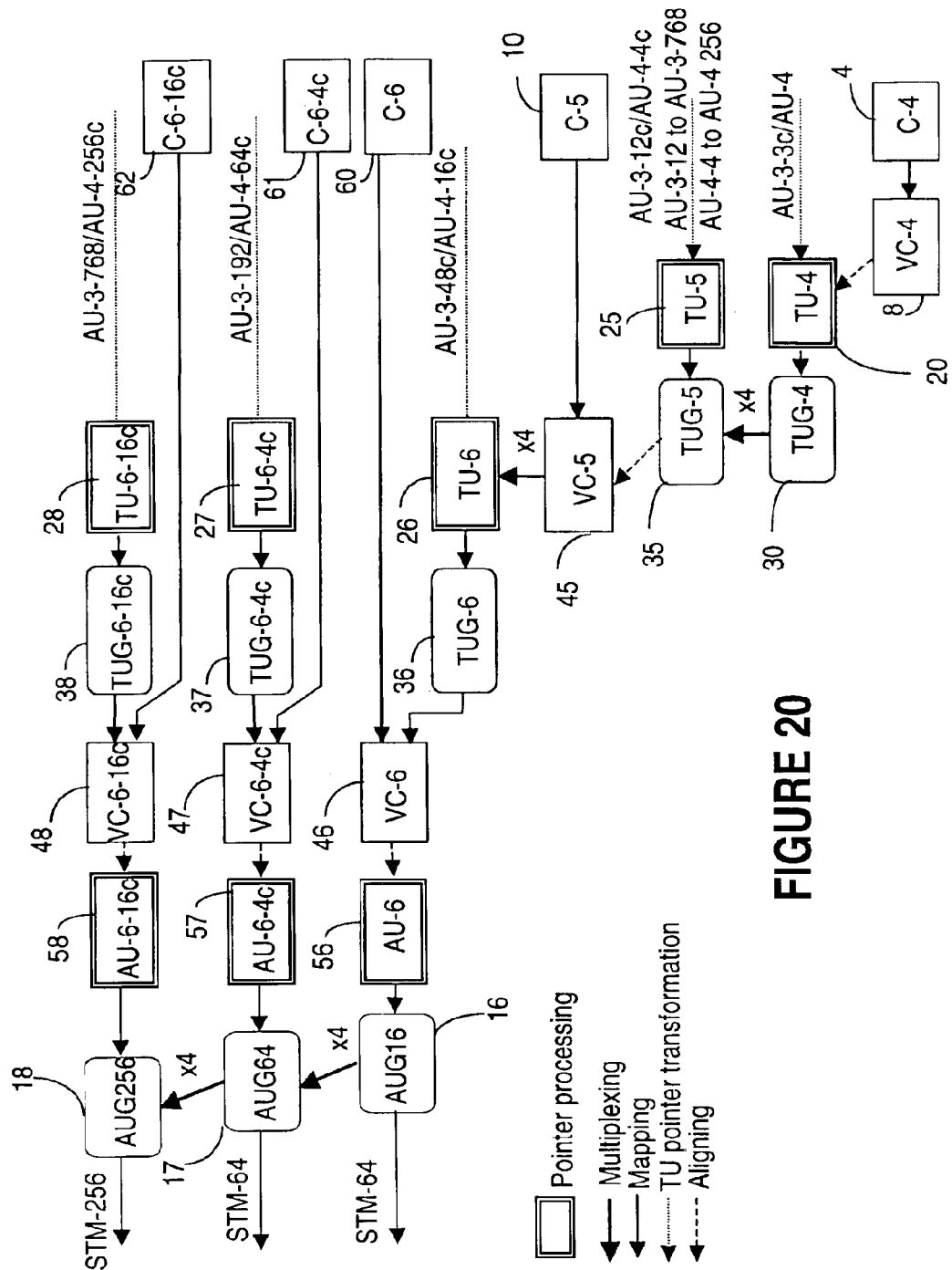
FIG. 20 is a block diagram of showing how the multiplex hierarchy can be extended for a VC-6 granularity.

The multiplex hierarchy in this invention is designed to be scalable to higher order virtual containers. FIG. 20 shows how this multiplex hierarchy may be extended for a VC-6 and its associated AU-6. The same principles as defined here can be applied to further scale the granularity of the hierarchy as the network demands increase.

The STM-4 frame comprises now an AUG-16 group 16, made of an AU-6, with the respective AU-6 pointer. The multiplexing hierarchy for containers C-6 is not show, and the hierarchy for C-4 and C-5 containers is similar to that illustrated in FIG. 2, using similar TU pointer transformations and AU to TU translations. As the hierarchy progresses to higher rates, a C-6 container 60 is directly mapped into a new VC-6 container 46. The VC-6 container 46 may also be made by translating AU-3-48c/AU-4/16c units to VC-6 granularity. Namely, these units are translated to a TU-6 unit 26 by transforming the AU-2 and AU-4 pointers into TU-6 pointers as shown by the fine dotted line. The TU-6 unit 26 is then mapped into a new TU-6 group 36, which is mapped into the VC-6 container 46. Similarly, TU-64c's are obtained by TU pointer transformation and Au to TU translation from AU-3-192c's or AU-4-64c's, and TU-6-16c's are obtained from AU-3-786c's or AU-4-256c's.

New concatenated TUG-6's are also provided, namely TUG-64c and TUG-6-16c. As detailed for AU-5 hierarchy, the AU-6 hierarchy can scale by multiplexing AUG-16 groups 16 to higher levels, as shown in FIG. 20.

Figure 21:
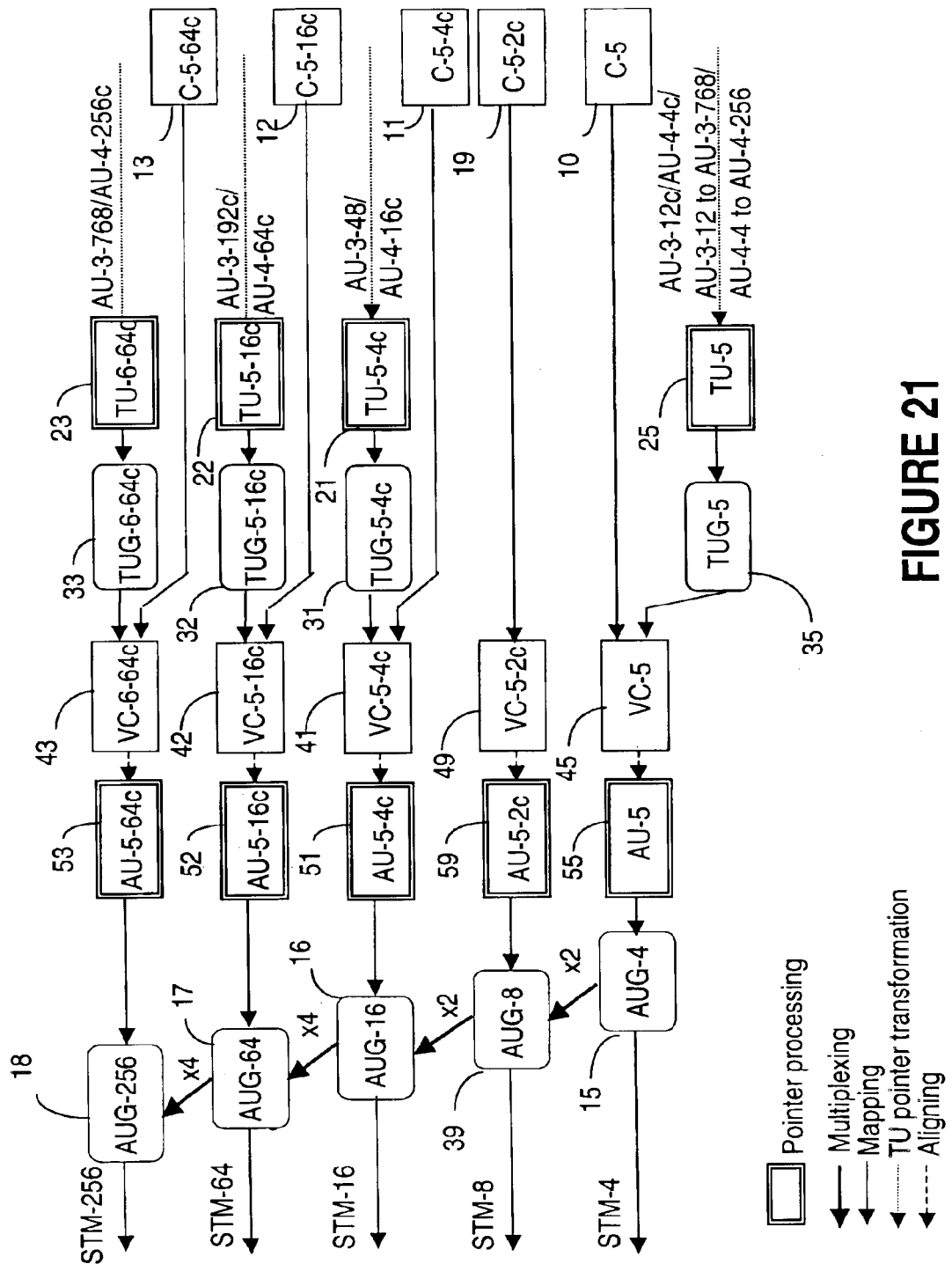
FIG. 21 is a block diagram of how the multiplex hierarchy can be applied to non-SDH/SONET formats.

It is also possible to optimize this hierarchy for transport of non-SDH/SONET formats. An example of how this can be implemented is shown in FIG. 21, where a 1 Gbps Ethernet signal is mapped into a C-5-2c which represents a STM-8. This principle can be extended to other non-SONET/SDH rates as currently defined.

We claim:

1. A method of assembling a frame structure of a SDH signal at a hierarchy level N, comprising:

receiving a hierarchically multiplexed administrative unit AU-n comprising an AU-n payload and an AU-n pointer;

transforming said AU-n into a tributary unit TU-n having a TU-n payload and a TU-n pointer such that said AU-n becomes said TU-n, said transforming including transforming said AU-n payload of said AU-n into the TU-n payload of said TU-n and transforming said AU-n pointer of said AU-n into said TU-n pointer of said TU-n; and hierarchically multiplexing said TU-n into said frame structure, where n≧3, and gives the granularity of said SDH signal, and said AU-n pointer transformed into said TU-n pointer provides the beginning of said TU-n payload with respect to said frame structure.

2. A method as claimed in claim 1, wherein said stop of transforming includes aligning said AU-n payload into said TU-n based on said TU-n pointer.

3. A method as claimed in claim 1, wherein said step of hierarchically multiplexing comprises:

mapping said TU-n into a tributary unit group TUG-n;

hierarchically multiplexing said TUG-n into a higher order TUG-k;

mapping said TUG-k into a higher order virtual container VC-k of same hierarchical level;

aligning said higher order virtual container into a AU-k by providing a AU-k pointer;

mapping said AU-k into a administrative unit group AUG-k and assembling said frame structure from said AUG-k, where k≧n.

4. A method as claimed in claim 2, wherein said step of transforming said AU-n payload comprises:

mapping the user information from said AU-n payload into said TU-n payload field; and providing fixed stuff bits whenever the size of said TU-n payload field is larger than the area occupied by said user information.

5. A method as claimed in claim 3, wherein said step of hierarchically multiplexing said TUG-n into a TUG-k comprises:

(a) mapping said TU-n into a TUG-n;

(b) multiplexing said TUG-n into a VC-k;

(c) mapping VC-k into a TU-k by adding a POH field corresponding to a hierarchical level k;

(d) mapping said TU-k into a TUG-k; and (e) repeating steps (a) to (c) to the hierarchy level N.

6. A method as claimed in claim 2, wherein n=3 and N=4 for obtaining a hierarchically multiplexed STM-4.

7. A method as claimed in claim 6, wherein said step of hierarchically multiplexing comprises:

mapping said TU-3 into a tributary unit group TUG-3;

hierarchically multiplexing said TUG-3 into a TUG-5;

mapping said TUG-5 into a higher order virtual container VC-5 of same hierarchical level;

aligning said higher order virtual container into a AU-5 by providing a AU-5 pointer;

mapping said AU-5 into a administrative unit group AUG-N; and assembling said frame structure from said AUG-4 group.

8. A method as claimed in claim 2, wherein n=4 and N=4 for obtaining a hierarchically multiplexed STM-4.

9. A method as claimed in claim 8, wherein said step of hierarchically multiplexing comprises:

mapping said TU-4 into a tributary unit group TUG-4;

hierarchically multiplexing said TUG-4 into a TUG-5;

mapping said TUG-5 into a higher order virtual container VC-5 of same hierarchical level;

aligning said higher order virtual container into a AU-5 by providing a AU-5 pointer;

mapping said AUG-5 into a administrative unit group AUG-N; and assembling said frame structure from said AUG-4 group.

10. A method of assembling a frame structure of a SDH signal comprising:

receiving a hierarchically multiplexed administrative unit AU-n-mc comprising a concatenated AU-n-mc payload and an AU-n-mc pointer;

transforming said AU-n-mc to a tributary unit TU-n-mc having a TU-n-mc payload and a TU-n-mc pointer such that said AU-n-mc becomes said TU-n-mc, said transforming including transforming said AU-n-mc payload of said AU-n-mc into the TU-n-mc payload of said TU-n-mc and transforming said AU-n-mc pointer of said AU-n-mc into said TU-n-mc pointer of said TU-n-mc; and hierarchically multiplexing said TU-n-mc into said frame structure, where $n \geq 3$, and give the granularity of said speed payload, m is the level of concentration and said AU-n-mc pointer transformed into said TU-n-mc pointer provides the beginning of said TU-n-mc payload with respect to said frame structure.

11. A method of reducing the number of AU pointers of a very high speed synchronous transport signal STM-N with AU-n granularity, an AU-n unit having an AU-n pointer and an AU-n payload where n=3, the method comprising:

for each AU-n unit, moving said AU-n pointer from the overhead field into said AU payload;

transforming said AU-n payload having the AU-n pointer placed therein into a TU-n payload of a tributary unit TU-n such that the AU-n becomes said TU-n; and hierarchically multiplexing said TU-n into a frame structure.

* * * * *

UNITED STATES PATENT AND TRADEMARK OFFICE
CERTIFICATE OF CORRECTION

PATENT NO. : 6,891,862 B1
DATED : May 10, 2005
INVENTOR(S) : Brady et al.

It is certified that error appears in the above-identified patent and that said Letters Patent is hereby corrected as shown below:

Column 14,
Line 33, delete "stop" and substitute -- step --.

Column 15,
Line 2, delete "(c)" and substitute -- (e) --.

Column 16,
Line 21, delete "n=3" and substitute -- n>=3 --.

Signed and Sealed this

Sixth Day of September, 2005

JON W. DUDAS
*Director of the United States Patent and Trademark Office*